United States Patent [19]

Dentella

[11] Patent Number: 5,119,573

[45] Date of Patent: Jun. 9, 1992

[54] SYSTEM TO DISTRIBUTE SLIDES ONTO A TRANSPARENT SCREEN

[76] Inventor: Alessandro Dentella, via Palestrina, 20, 20052 Monza, (Prov. of Milan), Italy

[21] Appl. No.: 656,608

[22] Filed: Feb. 15, 1991

Related U.S. Application Data

[63] Continuation-in-part of Ser. No. 613,661, Nov. 26, 1990, abandoned.

[30] Foreign Application Priority Data

Jan. 27, 1989 [IT] Italy ................................ 19223 A/89

[51] Int. Cl.⁵ ............................................. G02B 27/02
[52] U.S. Cl. .................................. 40/367; 206/455; 206/456
[58] Field of Search ............... 40/361, 366, 367, 124.4; 221/186, 187; 206/455, 456, 499

[56] References Cited

U.S. PATENT DOCUMENTS

| | | | |
|---|---|---|---|
| 3,419,984 | 1/1969 | Sakamoto | 40/367 |
| 3,779,423 | 12/1973 | Quinn et al. | 221/186 |
| 4,023,705 | 5/1977 | Reiner et al. | 221/186 |
| 4,226,038 | 10/1980 | Ashworth | 40/361 |
| 4,382,664 | 5/1983 | Karl et al. | 40/361 X |
| 4,858,355 | 8/1989 | Ozeki | 206/456 X |

*Primary Examiner*—Kenneth J. Dorner
*Assistant Examiner*—J. Bonifanti
*Attorney, Agent, or Firm*—Oliff & Berridge

[57] ABSTRACT

A system for photography easily distributes slides onto a light transparent screen and subsequently regroups the slides into a stack with the same sequence, without need to individually manipulate the slides. The system enables a user to view many slides at the same time minimizing the area needed. The system comprises a transparent screen with a plurality of longitudinally extending rails which define columns for the slides and a slide dispenser box, for use in conjunction with the screen, which dispenses and collects the slides on the screen. The rails have an interior saw-tooth profile and the dispenser has a flexible barrier disposed over the dispensing opening which together allow for one slide at a time to be distributed and collected.

8 Claims, 6 Drawing Sheets

SYSTEM TO DISTRIBUTE SLIDES ONTO A TRANSPARENT SCREEN

CROSS REFERENCE TO RELATED APPLICATION

This is a continuation-in-part of copending application No. 07/613,661 now abandoned, filed on Nov. 26, 1990, which application is hereby incorporated by reference.

FIELD OF THE INVENTION

The present invention concerns a device for photography meant to facilitate distributing of slides onto a transparent screen, and their successive restacking in orderly sequence.

BACKGROUND OF THE INVENTION

An owner of many photo slides often has an interest in rapidly reviewing one or more decks of slides, for example to select and pick some specific slides. Such review is possible after by spreading the slides of a deck onto a transparent screen, against which the slides can be reviewed directly.

Ideally, distributing slides onto the screen and subsequent picking up of the slides should respect the original sequence, and not be too laborious. Also, it is desirable to keep the required screen area to a minimum still satisfying the objects above.

Transparent or luminous screens are commercially available in various sizes, with surfaces fit to receive slides, for example in bins or in columns. However, there is no system so far available, that frees the user from manipulating slides to spread them onto the screen and to repack them afterwards. It is noted that slides, being rather thin, are not easily picked up from the screen, and that manipulations of the slides risk fingerprints on the slides.

SUMMARY OF THE INVENTION

An object of the present invention is to facilitate and speed up the above mentioned operations, freeing the user for individually manipulating the slides. A further advantage of the present invention is the high density of slides that can be obtained on the screen, regularly and automatically.

These and other objects are reached by the device according to the present invention, which comprises a small dispenser box which is capable of holding a stack of slides within its side and bottom walls and which is provided with a bottom slit through which slides can be released or captured one by one, as well as a transparent screen, whose surface designed to receive the slides is shaped with saw-tooth rails, alternating with flat strips (enclosed between two adjacent saw-tooth rails) which are lower in level than the minimum height of the saw-tooth profiles.

Further characteristics of the invention shall become clearer from the description of a preferred, but not exclusive, embodiment of the system, described by the enclosed drawings by way of example, but not limiting the present invention.

DESCRIPTION OF THE PREFERRED EMBODIMENTS

Figure 1:
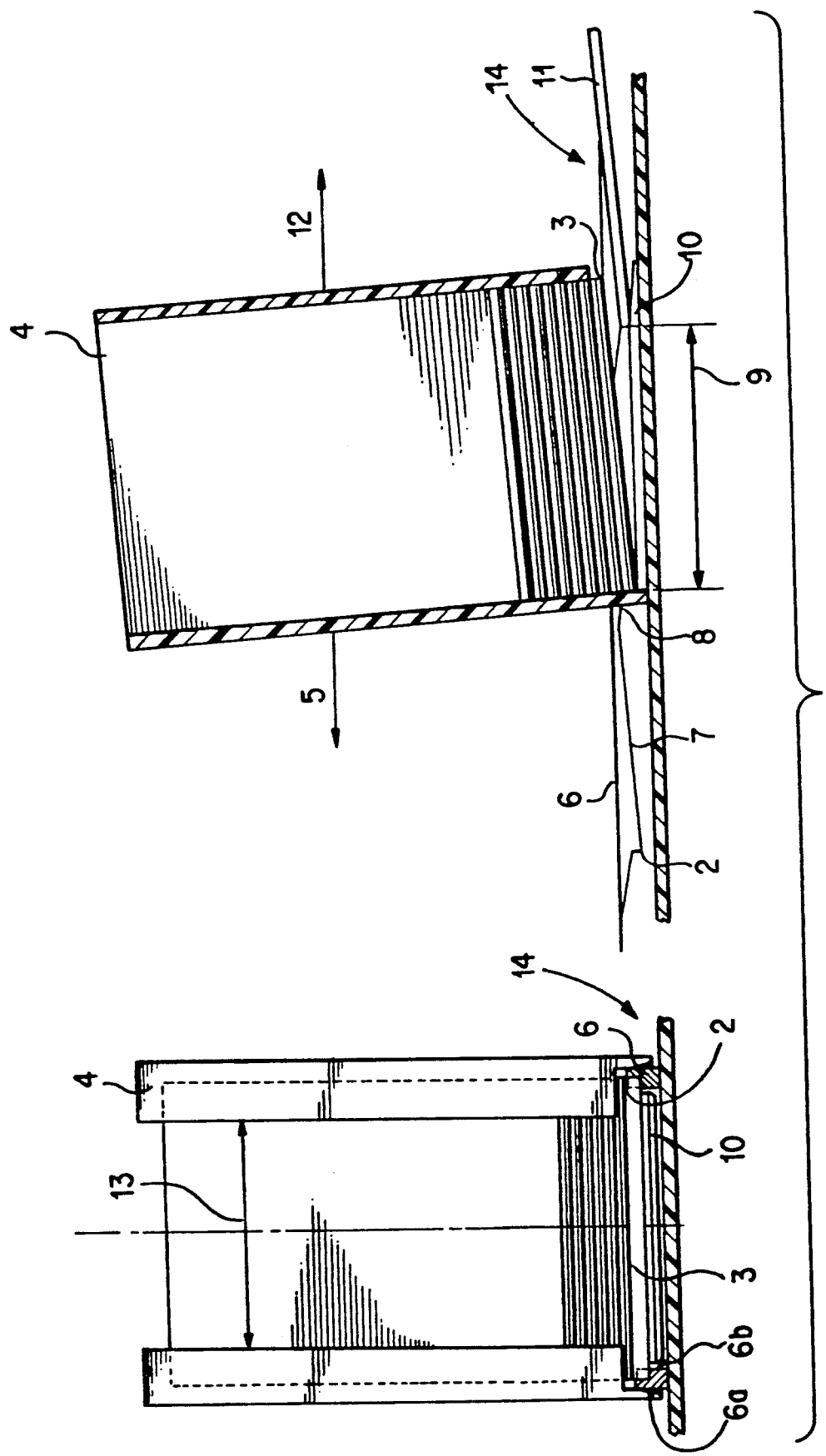
FIG. 1 shows in two orthogonal views, including a front elevation in partial section and a side elevation, the mutual working position of a shaped screen and its dispenser box.
Figure 2:
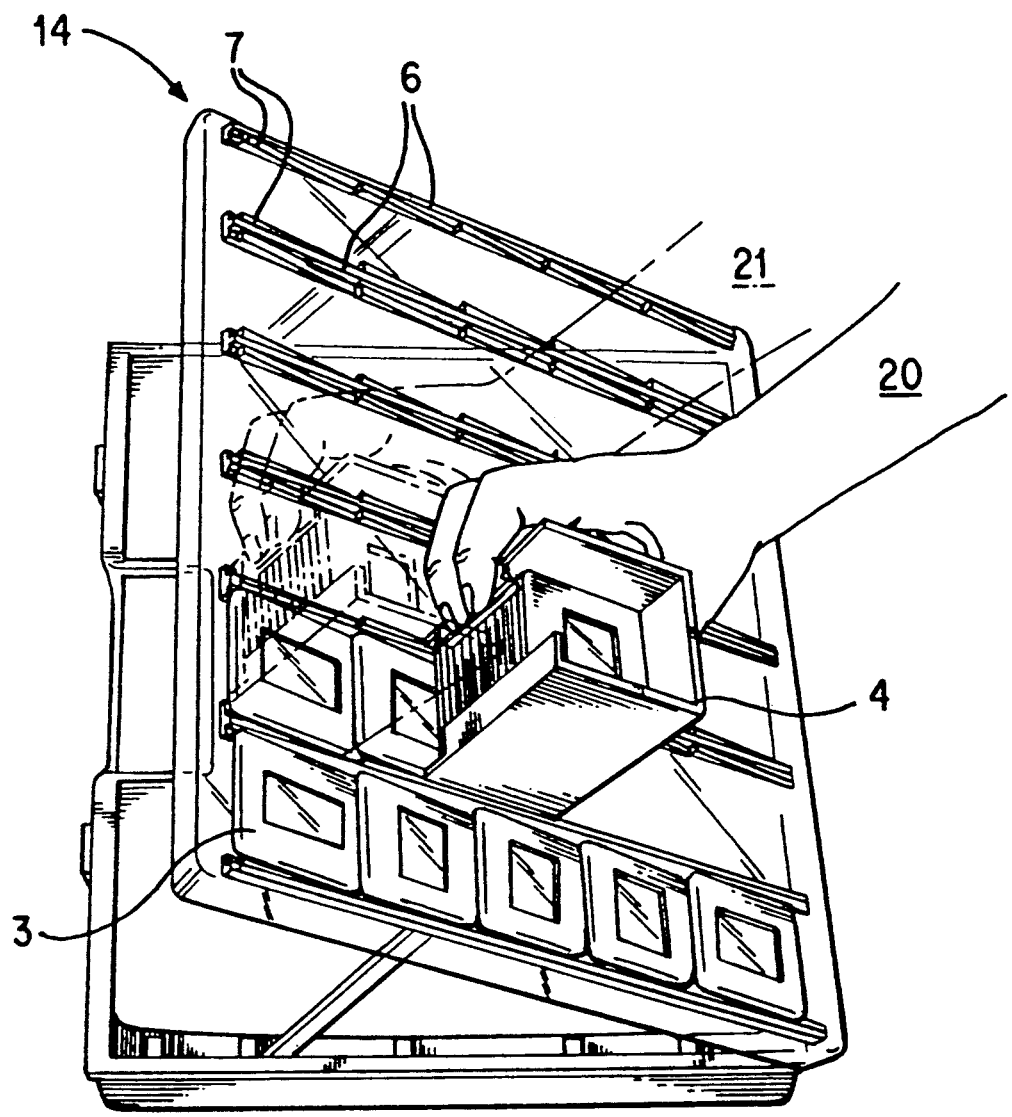
FIG. 2 shows in perspective a preferred embodiment of screen and dispenser.
Figure 4:
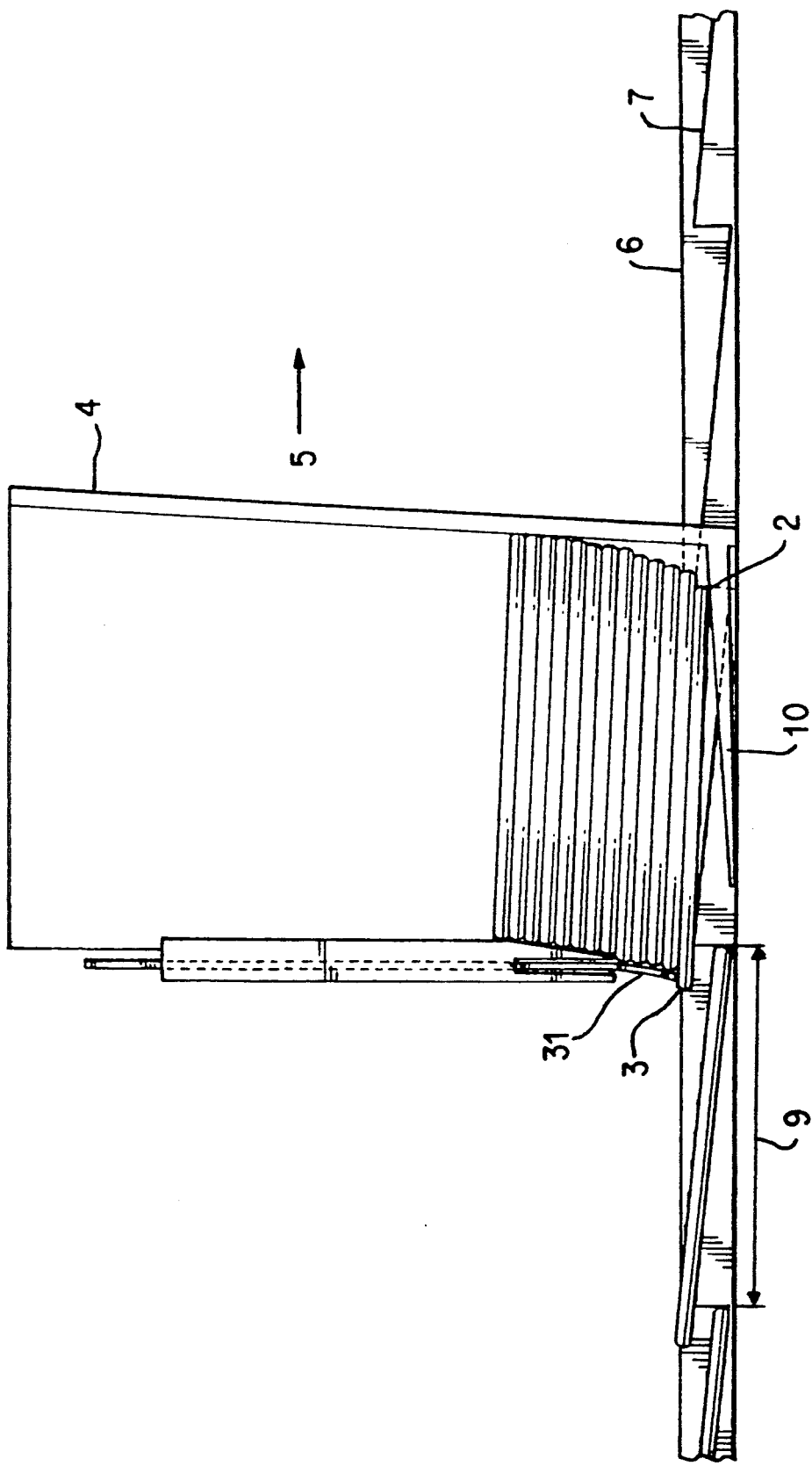
FIG. 4 shows a side view in detail the principle of distribution by the dispenser.

FIG. 1 shows in two orthogonal side views the mutual working position of a spaced screen 14 and the dispenser box; 4 according to the present invention. With respect to the orientation of the parts, the screen is sloping as shown in FIG. 2. The main design features of the screen 14, shown in FIG. 1, are a plurality of longitudinally extending straight rails 6 having a flat outer side 6a and an inner side 6b with a saw-tooth profile 7. The profile 7 has a tooth peak 2 low enough to cath and extract only one slide 3 from the dispenser box 4, when the dispenser box 4 is made to slide in the extraction direction of arrow 5 on the straight outer side 6a of rail 6. The inner sides of rail 6 act to laterally contain the slides 3, which rest on saw-tooth profile 7 as shown in FIG. 4. The saw-tooth profile 7 has a bevel 8 leading from stepped peak 2 to allow the remaining slides to pass over the saw-tooth to the next peak 2.

The distance 9 between two successive teeth (as shown also in FIGS. 4 and 5) is such as to overlay slides, similar to roof tiles, by part of the blank (frame) length.

The bottom 10 of the dispenser box 4 is wedge-shaped and fits between rails 6 as shown in FIG. 2, with its tip flusing parallel to the bottom of the screen surface, so as to make its way under slide 11 for capturing it and adding it to the stack, when the dispenser is made to slide in direction of the arrow 12.

The front of the dispenser has an opening 13 shown in FIG. 1, to facilitate loading and unloading the stack of slides.

FIG. 2 shows a transparent screen 14 according to the present invention as the lid of a box designed to hold many stacks of slides in a very compact way.

In operation the screen is kept inclined for many reasons among which are to facilitate the distribution as well as the picking up, of slides, to enable back lighting from a source (e.g. from a table top lamp) with light reflecting on a suitable surface laid on the box bottom part, and finally to allow easier viewing by a sitting user.

The operation of the above described system is as follows: to distribute the slides 3, one must load the stack of slides into the dispenser box 4, prepare the screen at the proper inclination and then make the dispenser 4 (guided by the straight rails 6) to slide downwards in each desired strip. The distributed slides 3 rest on the saw-tooth profiles 7. To restack, the box 4 must be slid in the opposite direction and sequence (from the last loaded strip, backwards).

As a further effort of clarity, in FIG. 2 a hand 20 moving the dispenser 4 is shown: if the hand moves from the dotted position 21 to the position 20, the dispenser 4 distributes the slides 3; when the hand moves backwards (from position 20 to position 21), the dispenser 4 restacks the slides 3.

Figure 3:
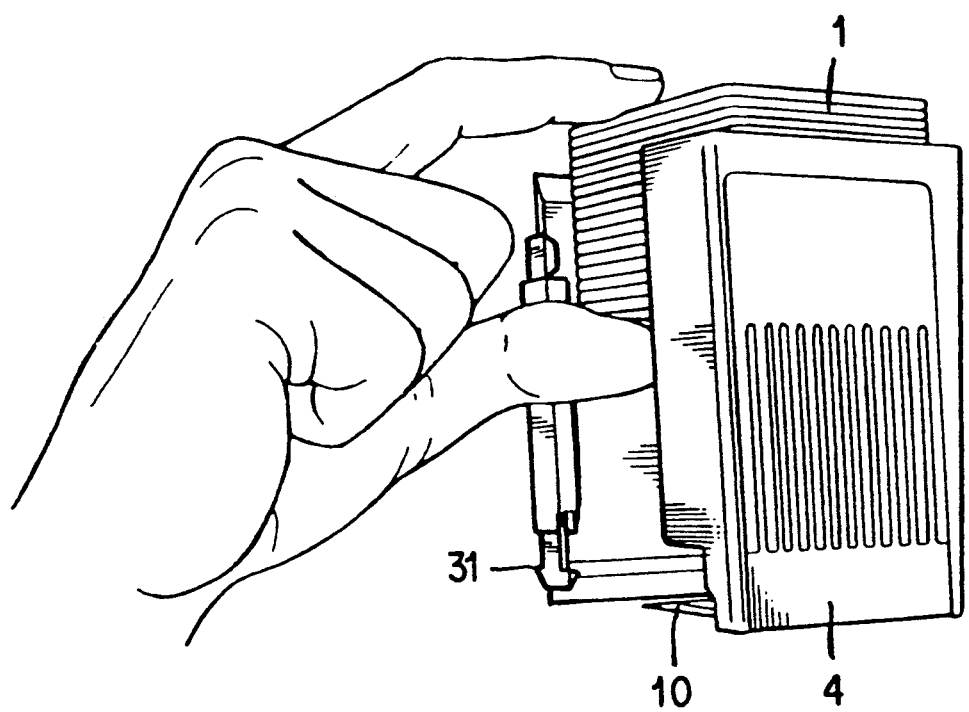
FIG. 3 shows a perspective close-up of the same dispenser.

Another version of the above system is illustrated by the three following figures:

FIG. 3 shows a stack 1 of slides 3 being introduced into (or being removed from) a dispenser box 4 which, to facilitate handling, is partially open on one side. In operation, the stack 1 of slides 3 rests on the wedge-shaped bottom 10 of the dispenser 4. Flexing means 31 (depicted solid black) is provided in order to allow only one slide at a time to exit from the dispenser 4 during distribution. Flexing means 31 can freely lift somewhat from its resting location in its tubular guide, and can also elastically bend.

FIG. 4 shows the above dispenser 4 moving along the straight rails 6 in direction of arrow 5 and distributing slide 3, while all slides above it, drawn by friction between the slides, are prevented by the flexing means 31 from exiting. For this same purpose, no more than one slide at a time must be caught by the vertical front of tooth peak 2, specifically by the part of it that reaches above the top of bottom wedge 10. One way to achieve this is to design for a bevel (8 of FIG. 1 above) although this is not shown in the embodiment of FIGS. 4 and 5.

Figure 5:
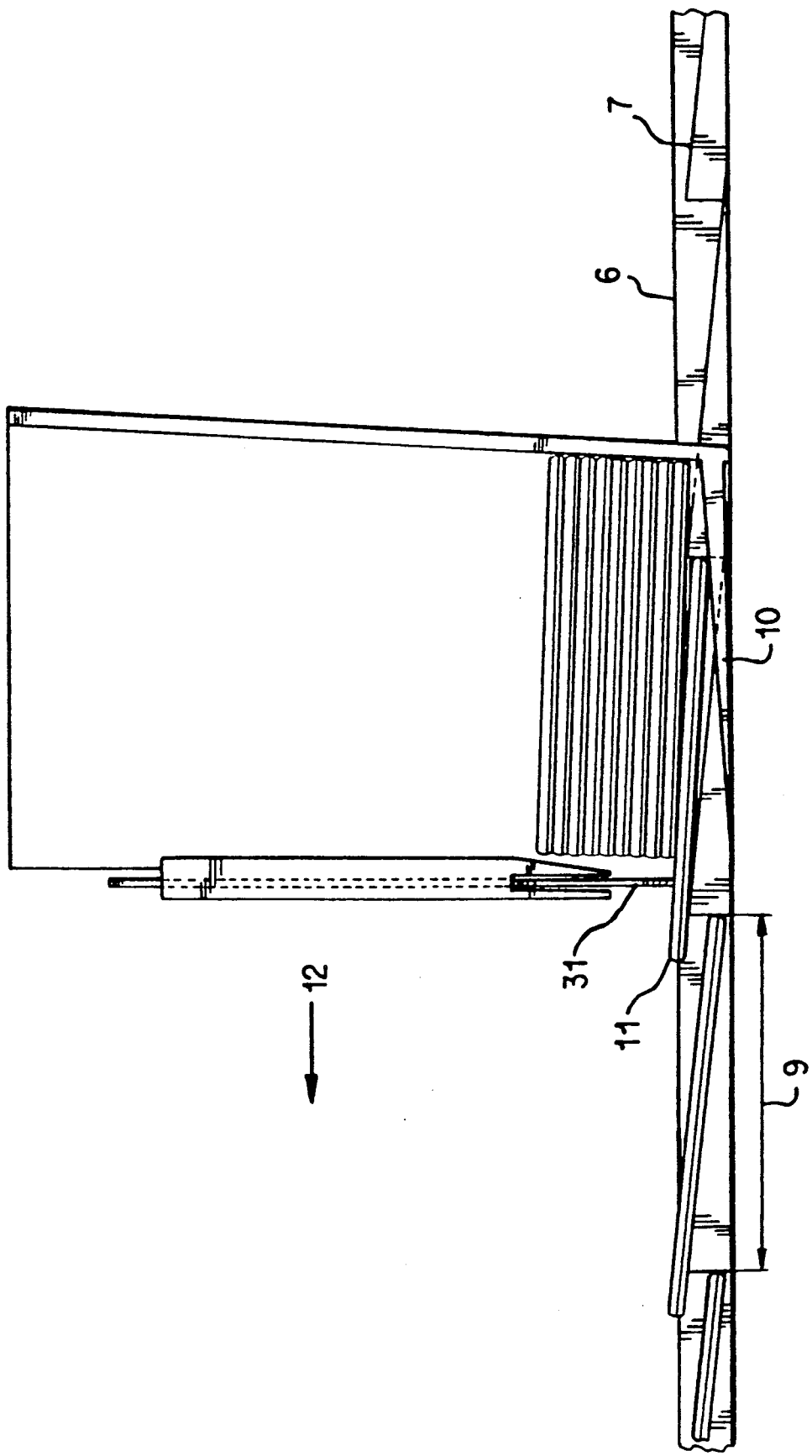
FIG. 5 shows a side view in detail the principle of pick-up by the dispenser.

FIG. 5 shows the same dispenser 4 picking up slide 11 as it moves according to arrow 12. For this purpose, the minimum height of the saw-tooth profile 7 should have enough clearance above the level of the center each strip to allow bottom 10 of dispenser 4 to fit beneath the slide.

Figure 6:
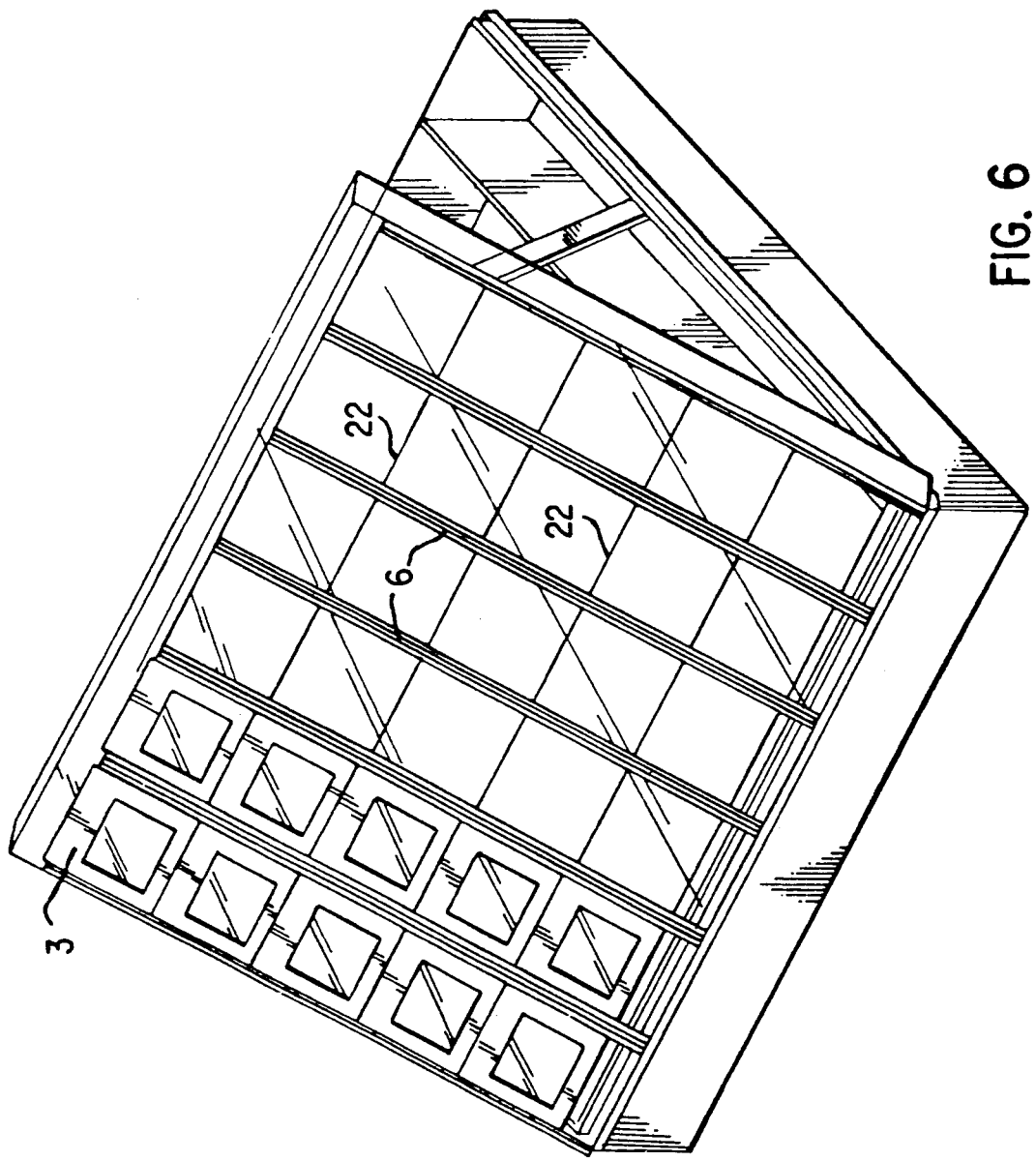
FIG. 6 shows a different embodiment of screen.

FIG. 6 shows a further screen embodiment where each strip 22 has a saw-tooth profile, and is sided by two flat rails 6 and by an outer border rail.

In another embodiment of the present invention, not shown in the drawings, the frame containing the slides 3 are obtained by assembling appropriate profiles (straight-shaped rails 6 and saw-toothed-shaped profiles 7), that can be mounted onto a flat light-transparent screen, such as the surface of an illuminated table.

What I claim is:

1. A system for distributing slides onto a transparent screen, comprising:

a dispenser box for housing a stack of slides, said box having side walls, a wedge-shaped bottom, an opening adjacent said bottom through which slides are distributed, and a flexible barrier disposed in said opening which provides for distribution and collection of one slide at a time from the stack of slides; and a transparent screen having a flat surface and a plurality of pairs of longitudinally extending rails, each said pair of rails defining a column for accommodating the distributed slides, each said rail having an outer generally flat straight side for guiding the side walls of the dispenser box when the dispenser box is astride a pair of rails and having a generally straight inner side with a saw-tooth profile thereon for catching and supporting the distributed slides.

2. A system according to claim 1, wherein said screen is substantially a lid of a box designed to hold slides.

3. A system according to claim 1, wherein said rails are coupled to said flat surface of said screen.

4. A system according to claim 1, wherein said flexible barrier is disposed generally perpendicular to said bottom.

5. A system according to claim 1, wherein said saw-tooth profile comprises a stepped peak portion for supporting a bottom edge of a slide, and an inclined portion for supporting a back surface of a slide.

6. A system according to claim 5, wherein said inclined portion has a length less than a slide.

7. A system according to claim 5, wherein said peak portion has a length no more than the combined thickness of said bottom and a slide.

8. A system according to claim 1, wherein said bottom is less wide than one of said columns.

* * * * *